United States Patent
Ginestra

(10) Patent No.: US 10,767,120 B2
(45) Date of Patent: Sep. 8, 2020

(54) METHOD OF OPERATING AN EBULLATED BED PROCESS TO REDUCE SEDIMENT YIELD

(71) Applicant: SHELL OIL COMPANY, Houston, TX (US)

(72) Inventor: Josiane Marie-Rose Ginestra, Richmond, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 15/495,082

(22) Filed: Apr. 24, 2017

(65) Prior Publication Data

US 2017/0306249 A1 Oct. 26, 2017

Related U.S. Application Data

(60) Provisional application No. 62/327,072, filed on Apr. 25, 2016.

(51) Int. Cl.
| | | |
|---|---|---|
| *C10G 47/26* | (2006.01) | |
| *C10G 47/24* | (2006.01) | |
| *B01J 35/10* | (2006.01) | |
| *B01J 37/00* | (2006.01) | |
| *B01J 37/08* | (2006.01) | |
| *B01J 35/02* | (2006.01) | |
| *B01J 23/883* | (2006.01) | |
| *B01J 27/19* | (2006.01) | |
| *C10G 65/00* | (2006.01) | |

(52) U.S. Cl.
CPC ............ *C10G 47/26* (2013.01); *B01J 23/883* (2013.01); *B01J 27/19* (2013.01); *B01J 35/023* (2013.01); *B01J 35/026* (2013.01); *B01J 35/108* (2013.01); *B01J 35/1042* (2013.01); *B01J 37/0009* (2013.01); *B01J 37/08* (2013.01); *C10G 47/24* (2013.01); *C10G 65/00* (2013.01); *C10G 2300/202* (2013.01); *C10G 2300/208* (2013.01); *C10G 2300/70* (2013.01)

(58) Field of Classification Search
CPC ........ C10G 47/02; C10G 47/04; C10G 47/24; C10G 49/04; C10G 49/12; C10G 47/26
See application file for complete search history.

(56) References Cited

U.S. PATENT DOCUMENTS

2012/0152805 A1* 6/2012 Chabot .................. C10G 49/02
208/108
2013/0306517 A1* 11/2013 Kester .................. B01J 35/1019
208/89

* cited by examiner

*Primary Examiner* — Renee Robinson
(74) *Attorney, Agent, or Firm* — Charles W. Stewart

(57) ABSTRACT

An improved method of operating a conventional ebullated bed process for the hydroconversion of heavy hydrocarbon feedstocks so as to provide for low or reduced sediment content in the conversion product without the loss of hydrodesulfurization function.

10 Claims, 1 Drawing Sheet

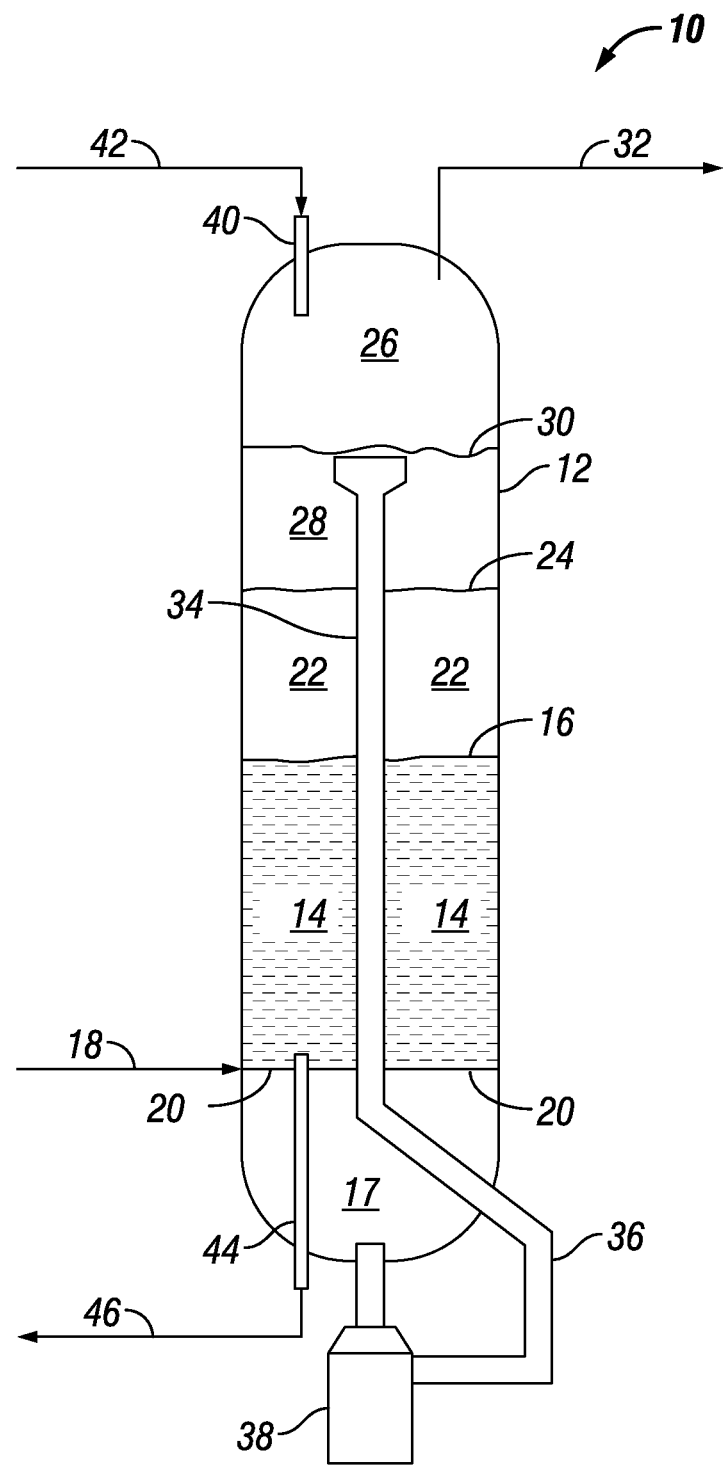

METHOD OF OPERATING AN EBULLATED BED PROCESS TO REDUCE SEDIMENT YIELD

The present application claims the benefit of U.S. Provisional Application Ser. No. 62/327,072, filed 25 Apr. 2016, the entire disclosure of which is hereby incorporated by reference.

The invention relates to a method of operating an ebullated bed process for the hydroconversion and hydroprocessing of a heavy hydrocarbon feedstock providing for high conversion with low sediment yield.

There are many processes that provide for the hydrotreatment and conversion of heavy oil feedstocks including the conversion of asphaltenes contained in the heavy oil. One problem associated with these processes is that the conversion of asphaltenes and heavy hydrocarbons to lighter hydrocarbons is usually accompanied by the undesirable formation of sediment. Sediment is a deposit which can be measured by the Shell Hot Filtration Solid Test (SHFST) describe by Van Kerknoort et al., J. Inst. Pet., 37, pages 596-604 (1951) or by testing method ASTM-4870. Sediment generally comprises hydrocarbon species having an atmospheric boiling temperature of at least 340° C.

Numerous processes have been proposed in the art to solve the problem of sediment formation that results from the hydroprocessing and conversion of heavy hydrocarbon oils. For instance, U.S. Pat. No. 7,491,313 discloses a two-step process that provides for upgrading of heavy hydrocarbon oil while inhibiting sediment formation. In this process, a first catalyst of the first step provides for demetallization of and asphaltene removal from the heavy oil, and an independently selected second catalyst of the second step, having a different composition and pore size distribution from those properties of the first catalyst, provides for desulfurization and hydrogenation of the heavy oil while inhibiting sediment formation due to precipitation of asphaltenes. The catalysts of the two-step process are supported on spherical, cylindrical, or polylobal shaped carrier particles that are impregnated with the metals. The particles have a diameter in the range of from about 0.5 mm to about 10 mm, but a larger diameter is preferred that is in the range of from about 0.7 mm to about 1.2 mm.

It is an object of the invention to provide for an improved operation of an ebullated bed process for the hydroconversion of heavy hydrocarbon feedstocks so as to yield a heavy hydrocarbon conversion product having a reduced sediment content relative to the sediment content of a conversion product that is yielded from a conventionally operated ebullated bed process.

Another object of the invention is to improve the operation of a conventional ebullated bed process system designed for the use of larger particle size ebullated bed catalysts so as to yield a heavy hydrocarbon conversion product having a reduced sediment content.

Accordingly, a method is provided for the improved operation of an ebullated bed process for the hydroconversion of a heavy hydrocarbon feedstock. This method includes providing an ebullated bed reactor system, comprising an ebullated bed reactor vessel that defines a reactor volume within which is an ebullated bed reaction zone defined by a catalyst bed comprising first shaped hydroprocessing catalyst particles having a first geometry providing for a first ratio of the cross section perimeter-to-cross sectional area that is less than 5 $mm^{-1}$. The reactor volume of the ebullated bed reactor system further includes an upper zone above the ebullated bed reaction zone and a lower zone below the ebullated bed reaction zone. The heavy hydrocarbon feedstock is introduced into the ebullated bed reaction zone, which is operated under hydroconversion reaction conditions. A portion of the first shaped hydroprocessing catalyst particles is removed from the catalyst bed, and an incremental amount of second shaped hydroprocessing catalyst particles having a second geometry providing for a second ratio of the cross section perimeter-to-cross sectional area that is at least 5 $mm^{-1}$ is added to the catalyst bed. A heavy hydrocarbon conversion product yielded from the reactor volume of the ebullated bed reactor vessel has a reduced sediment content.

Another embodiment of the inventive method includes operating an ebullated bed process for the hydroconversion of a heavy hydrocarbon feedstock by providing an ebullated bed reactor system that is designed for the use of first shaped hydroprocessing catalyst particles. These particles have a first geometry providing for a first ratio of the cross section perimeter-to-cross sectional area that is less than 5 $mm^{-1}$ in a catalyst bed that defines an ebullated bed reaction zone contained within a reactor volume defined by an ebullated bed reactor vessel. The reactor volume includes an upper zone above the ebullated bed reaction zone and a lower zone below the ebullated bed reaction zone. The heavy hydrocarbon feedstock is introduced into the ebullated bed reaction zone, which is operated under hydroconversion reaction conditions. Second shaped hydroprocessing catalyst particles having a second geometry providing for a second ratio of the cross section perimeter-to-cross sectional area that is at least 5 $mm^{-1}$ is introduced into the reactor volume. A heavy hydrocarbon conversion product yielded from the reactor volume of the ebullated reactor vessel has a low sediment content.

FIG. 1 is a simplified schematic representation of certain aspects of ebullated bed reactor system of the invention.

The invention provides for an improved operation of conventionally operated ebullated bed processes that include the conversion of a heavy hydrocarbon feedstock so as to yield a heavy hydrocarbon conversion product. The conversion product yielded from the better operated ebullated bed process has a reduced sediment content that is lower than is expected of the conversion products that usually are yielded from conventionally operated ebullated bed processes. This reduction of sediment yield with the conversion product is unexpectedly achieved with little to no reduction, and in some cases a slight increase, in the hydrodesulfurization of the heavy hydrocarbon feedstock.

Conventional ebullated bed process systems are typically designed with the use of conventional, large particle size ebullated bed catalysts in mind instead of the use of small particle size ebullated catalysts. Commercially available ebullated bed hydroprocessing catalysts are generally for a variety of technical and commercial reasons only available in larger particle sizes. Thus, conventionally designed and operated ebullated bed process systems include an ebullated bed reaction zone that is contained within a reactor volume of their ebullated bed reactor vessel and defined or formed by a catalyst bed of large-size, shaped hydroprocessing catalyst particles.

It is unexpected that the operation of an ebullated bed reactor system using small-size, ebullated bed catalyst particles, having certain geometric characteristics as defined herein, to form its catalyst bed provides for the production or yielding of a heavy hydrocarbon conversion product having a low sediment content that is lower than expected with the operation of an ebullated bed reactor system utilizing large-size, ebullated bed catalyst particles to form the catalyst bed. This reduced sediment content relative to the sediment content of a conventionally produced heavy hydrocarbon conversion product is achieved with an immaterial or no reduction in hydrodesulfurization of the heavy hydrocarbon feedstock.

The inventive method, thus, provides for hydroprocessing heavy hydrocarbon feedstocks that typically contain contaminating concentrations of organic sulfur, nitrogen and metal compounds as well as containing asphaltenes. The heavy hydrocarbon feedstock may be derived from crude oil or tar sand hydrocarbon materials comprising a major portion of hydrocarbons boiling at temperatures exceeding 343° C. (650° F.). The method is particularly useful in treating heavy hydrocarbon feedstocks that have especially high proportions of pitch hydrocarbons that boil at temperatures exceeding 524° C. (975° F.). In certain embodiments of the method, the portion of the heavy hydrocarbon feedstock comprising pitch exceeds 50 wt. % of the heavy hydrocarbon feedstock. The ebullated bed process provides for significant conversion of the pitch hydrocarbons to hydrocarbons having boiling temperatures below 524° C. (975° F.).

A conventional ebullated bed reactor system includes an ebullated bed reactor vessel. This ebullated bed reactor vessel defines a reactor volume. Contained within the reactor volume is an ebullated bed reaction zone defined by a catalyst bed comprising first shaped hydroprocessing catalyst particles having a first geometry providing for its characteristic first ratio. The first ratio is defined by the particle outer perimeter divided by the cross sectional area of the particle cross section (i.e., cross section perimeter-to-cross sectional area). As noted above, the ebullated bed catalyst particles of the conventional systems are typically larger size particles, and, thus, the first ratio of the first shaped hydroprocessing catalyst particles of these systems typically is less than 5 $mm^{-1}$, more typically, less than 4.8 $mm^{-1}$, and, most typically, less than 4.5 $mm^{-1}$.

The inventive method includes operating an ebullated bed reactor system that is designed for use and operation with the first shaped hydroprocessing catalyst particles having a characteristic first ratio as described above. This method includes introducing the heavy hydrocarbon feedstock into the ebullated bed reaction zone of the ebullated bed reactor system, which is operated under suitable hydroconversion reaction conditions, as described in detail elsewhere herein. The second shaped hydroprocessing catalyst particles having a second geometry providing for a characteristic second ratio of cross section perimeter-to-cross sectional area are introduced into the reactor volume to form the ebullated bed reaction zone. The second ratio of the second shaped hydroprocessing catalyst particles is at least or greater than 5 $mm^{-1}$, preferably, greater than 5.5 $mm^{-1}$, and, more preferably, greater than 6 $mm^{-1}$. The second ratio should be less than 8 $mm^{-1}$. Preferably, the second ratio is less than 7.5 $mm^{-1}$, and, more preferably, it is less than 7 $mm^{-1}$.

It is unexpected that the inventive method yields a heavy hydrocarbon conversion product having relatively lower sediment content with insignificant or no loss of hydrodesulfurization function and this is achieved by modifying the operation of a conventional ebullated bed process or its system by the use of small-size catalyst particles having a unique geometry such that they have a characteristic ratio of cross section perimeter-to-cross sectional area that is larger than typical.

In an embodiment of the inventive method, an ebullated bed reactor system, which includes within its reactor volume an ebullated bed reaction zone defined by a catalyst bed comprising the first shaped hydroprocessing catalyst particles, is operated under suitable hydroconversion reaction conditions with the heavy hydrocarbon feedstock being introduced into its ebullated bed reaction zone. This system is then modified by removing a portion of the first shaped hydroprocessing catalyst particles, either on a continuous or non-continuous or a periodic basis, from the catalyst bed or ebullated bed reaction zone to which incremental amounts of second shaped hydroprocessing catalyst particles are added either on a continuous or non-continuous or a periodic basis. The removal from the ebullated bed reaction zone of the larger size catalyst particles and addition of the smaller size catalyst particles cause the catalyst bed to change its characteristics in a manner that provides for high conversion of the heavy hydrocarbon feedstock with a significant reduction of the sediment yield without loss of hydrodesulfurization function.

Typically, the rate (weight units per time units) at which the inventory of catalyst contained within the reactor volume and removed from the ebullated bed reactor system is in the range upwardly to 5% of the total weight of the catalyst inventory per day of operation. More typically, this rate of catalyst removal is in the range of from 0.5% to 4% of the total weight of the catalyst inventory per day of operation. The addition rate of the second shaped hydroprocessing catalyst particles may also be at rates similar to the removal rate of the catalyst inventory with the addition rate of second shaped hydroprocessing catalyst particles to the ebullated bed reaction zone being in the range upwardly to 5%, preferably from 0.5% to 4% of the total weight of the catalyst inventory per day of operation. This is done in order to maintain a catalyst inventory within the reactor volume and to change the characteristic mix or ratio of the two different catalysts.

The relative mix or ratio of the first shaped hydroprocessing catalyst particles-to-the second shaped hydroprocessing catalyst particles of the catalyst bed changes with the removal of portions of the ebullated bed reactor catalyst inventory and introduction of incremental amounts of the second shaped hydroprocessing catalyst particles. This is continued until a desired ratio of the two catalysts is obtained that provides for the desired reduction in sediment yield or properties of the heavy hydrocarbon conversion product.

In another aspect of the inventive method, portions of the first shaped hydroprocessing catalyst particles are continuously removed from the catalyst bed of the ebullated bed reaction zone that includes the first shaped hydroprocessing catalyst particles and replaced with similar incremental amounts of the second shaped hydroprocessing catalyst particles until the inventory of first shaped hydroprocessing catalyst particles is immaterial or insignificant. It is at this time that portions of the catalyst inventory are continued to be removed from the ebullated bed reaction zone at a desired removal rate. Incremental amounts of the second shaped hydroprocessing catalyst particles are continuously, discontinuously or periodically introduced or added to the catalyst bed at a similar rate to the removal rate of catalyst from the catalyst bed. This may result in a system equilibrium.

The inventive method may also provide for the operation of the ebullated bed reactor system with a desired ratio of the two catalysts within the ebullated bed reaction zone. This is achieved by adjusting the incremental addition rates of the first shaped hydroprocessing catalyst particles and the second shaped hydroprocessing catalyst particles so as to maintain the desired ratio of the two catalysts while removing portions of the catalyst inventory from the ebullated bed reaction zone at similar rates to those of the addition rates.

The second shaped hydroprocessing catalyst particles comprise, consist essentially of, or consist of an inorganic oxide component and one or more or at least one active catalytic metal component. The catalyst particles may be prepared or made by any suitable method provided that their geometry provides for a second ratio of the cross section perimeter-to-cross sectional area as defined elsewhere herein. The catalyst particles may be an impregnated-type catalyst or a co-mulled-type catalyst in the form of a shaped particle having the second geometry that provides for the second ratio. The second geometry may be any geometry that contributes to the noted benefits provided by the inventive operating method and having the aforementioned second ratio. Examples of possible shapes of the particles are described in such patent publications as, US 2013/0306517, published 21 Nov. 2013; US 2004/0185244, published 23 Sep. 2004; U.S. Pat. No. 4,394,303, issued 19 Jul. 1983; and U.S. Pat. No. 4,028,227, issued 7 Jun. 1977. These patents and patent publications are incorporated herein by reference. One geometry particularly useful in the inventive method is the trilobe shape described in the patent application filed concurrently with this application and having Ser. No. 62/327,057, the disclosure of which is incorporated herein by reference.

Suitable inorganic oxides that may be used to make the second shaped hydroprocessing catalyst particles of the method include silica, alumina, and silica-alumina. Preferred is either alumina or silica-alumina. The most preferred inorganic oxide component of the second shaped hydroprocessing catalyst is alumina.

The second shaped hydroprocessing catalyst particles comprise an amount of the inorganic oxide component that is in the range of from about 70 to about 99 weight percent (wt. %) of the total weight of the catalyst particle. Preferably, the amount of inorganic oxide material in the shaped hydroprocessing catalyst particle is in the range of from 78 to 97 wt. %, and, most preferably, from 83 to 96 wt. %. This weight percent is based on the total weight of the second shaped hydroprocessing catalyst particle.

The active catalytic metal components of the second shaped hydroprocessing catalyst particles include a nickel component or a molybdenum component, or a combination of a nickel component and a molybdenum component. This catalyst may further include a phosphorus component.

The molybdenum component is present in the second shaped hydroprocessing catalyst particle in an amount that is greater than 1 wt. % and in an amount that is less than 24 wt. % when calculated as an oxide. It is preferred, however, for the molybdenum component to be present in the second shaped hydroprocessing catalyst particle in an amount in the range of from 3 wt. % to 15 wt. %, and, more preferred, from 4 wt. % to 12 wt. %. These weight percentages (wt. %) are based on the total weight of the second shaped hydroprocessing catalyst particle (i.e., the total weight includes the sum of all the individual components of the catalyst composition including the support material, metals, and any other components) and assuming that the molybdenum component is present in the oxide form, $MoO_3$, regardless of its actual form.

The nickel component is present in the second shaped hydroprocessing catalyst particle in an amount up to 6 wt. %, when calculated as nickel oxide, NiO. It is preferred, however, for the nickel component to be present in the second shaped hydroprocessing catalyst particle in an amount in the range of from 0.5 wt. % to 6 wt. %, and, more preferred, from 0.75 wt. % to 5 wt. %. These weight percentages (wt. %) are based on the total weight of the second shaped hydroprocessing catalyst particle (i.e., the total weight includes the sum of all the individual components of the catalyst composition including the support material, metals, and any other components) and assuming that the nickel component is present in the oxide form, NiO, regardless of its actual form.

The second shaped hydroprocessing catalyst particle may also include a phosphorous component. The amount of the phosphorous component in the second shaped hydroprocessing catalyst particle can be in the range up to about 6 wt. % (2.63 wt. % elemental phosphorous). Typically, the phosphorous component is present in the catalyst composition in the range of from 0.1 wt % to 5 wt. %, and, more preferred, from 0.2 wt. % to 4 wt. %. These weight percentages (wt. %) are based on the total weight of the second shaped hydroprocessing catalyst particle and assuming that the phosphorous component is present in the oxide form, $P_2O_5$, regardless of its actual form.

The preferred heavy hydrocarbon feedstock has a boiling range such that at least 70 weight percent boils at a temperature exceeding 524° C. (975° F.), and, most preferably, at least 80 weight percent of the heavy hydrocarbon feedstock boils at a temperature exceeding 524° C. (975° F.).

The API gravity of the heavy hydrocarbon feedstock can range from about 0 to about 15, but, more specifically, the API gravity is in the range of from 0 to 10, and, more specifically, from 2 to 8.

The heavy hydrocarbon feedstock can have a Conradson carbon content, as determined by ASTM testing method D-189, exceeding 10 weight percent, and, more specifically, the Conradson carbon content is in the range of from 15 weight percent to 30 weight percent.

The heavy hydrocarbon feedstock of the inventive process typically includes high concentrations of sulfur and nitrogen compounds and metals, such as, nickel and vanadium.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 7 weight percent.

Regarding the nitrogen compounds contained in the heavy hydrocarbon feedstock, they are usually present in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 1 weight percent.

The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 300 ppmw.

The vanadium concentration in the heavy hydrocarbon feedstock can exceed 30 ppmw or it can exceed 75 ppmw. More specifically, the vanadium concentration in the heavy hydrocarbon feedstock can be in the range of from 100 ppmw to 1500 ppmw.

The inventive method includes contacting the heavy hydrocarbon feedstock, preferably in the presence of hydrogen, with the second shaped hydroprocessing catalyst under suitable hydroconversion conditions within the ebullated bed reaction zone. As has been noted, the inventive method provides for a high percentage conversion of the pitch component of the heavy hydrocarbon feedstock with a low sediment yield along with the heavy hydrocarbon conversion product.

Suitable hydroconversion conditions under which the heavy hydrocarbon feedstock is contacted with the second shaped hydroprocessing catalyst can include a hydroconversion contacting temperature in the range of from about 316° C. (600° F.) to about 538° C. (1000° F.), a hydroconversion total contacting pressure in the range of from about 1000 psia to about 4,000 psia, which includes a hydrogen partial pressure in the range of from about 800 psia to about 3,000 psia, a hydrogen addition rate per volume of heavy hydrocarbon feedstock in the range of from about 2000 SCFB to about 10,000 SCFB, and a hydroconversion liquid hourly space velocity (LHSV) in the range of from about 0.1 $hr^{-1}$ to 5 $hr^{-1}$.

The preferred hydroconversion contacting temperature is in the range of from 316° C. (600° F.) to 510° C. (950° F.), and, most preferred, it is from 371° C. (700° F.) to 455° C. (850° F.). The preferred hydroconversion contacting pressure is in the range of from 1000 psia to 3500 psia, and, most preferred, it is from 1,500 psia to 3,000 psia, with a preferred hydrogen partial pressure of from 1800 psia to 2,800 psia, and most preferred, from 2,000 psia to 2,500 psia. The LHSV is preferably in the range of from 0.2 $hr^{-1}$ to 4 $hr^{-1}$, and, most preferably, from 0.2 to 3 $hr^{-1}$. The hydrogen addition rate per volume of heavy hydrocarbon feedstock is preferably in the range of from 2000 SCFB to 8,000 SCFB, and, more preferably, from 3000 SCFB to 6,000 SCFB.

The inventive method of operating an ebullated bed process provides low or reduced sediment yield with conversion product that is below the sediment yield that is typically results with conventional ebullated bed processes. It is unexpected that this exceptionally low sediment yield is achieved with little or no reduction in the hydrodesulfurization function. The sediment content of the heavy hydrocarbon conversion product of the inventive method can be less than 0.4 wt. %. It is desirable for this sediment content to be as low as is achievable, and the new method of operating an ebullated bed process can provide for it to be less than 0.35 wt. % or even less than 0.3 wt. %. Sediment is determined by testing method ASTM-4870.

FIG. 1 presents a simplified schematic representation of an ebullated bed reactor system 10. The ebullated bed reactor system 10 includes elongated vessel 12 that defines several zones such as a contacting zone (ebullated bed reaction zone) for contacting a heavy hydrocarbon feedstock under suitable hydroconversion reaction conditions with a shaped hydroconversion catalyst and a separation zone (upper zone) for the separation of a hydrotreated heavy hydrocarbon product from the shaped hydroconversion catalyst.

Within elongated vessel 12 is a settled hydroconversion catalyst bed 14 having a settled hydroconversion catalyst bed level 16. A reactor feed comprising heavy hydrocarbon feedstock and hydrogen is introduced into lower zone 17 located below the ebullated catalyst bed within elongated vessel 12 by way of conduit 18.

The reactor feed passes through horizontal distributor plate 20 that provides means for directing the reactor feed upwardly and through settled hydroconversion catalyst bed 14. The passing of the reactor feed through settled hydroconversion catalyst bed 14 serves to lift and to expand the bed of shaped hydroconversion catalyst to thereby provide an expanded hydroconversion catalyst bed 22 (ebullated catalyst bed) having an expanded hydroconversion catalyst bed level 24.

In separation zone 26 (upper zone) of elongated vessel 12 (ebullated bed reactor vessel), hydroconversion catalyst is separated from liquid hydrocarbon 28, having a liquid level 30, and the heavy hydrocarbon conversion product, which passes from elongated vessel 12 by way of conduit 32.

Downcomer 34 within elongated vessel 12 provides conduit means for recycling the liquid hydrocarbon 28 to the bottom of expanded hydroconversion catalyst bed 22. Conduit 36 is operatively connected in fluid flow communication between downcomer 34 and ebullating pump 38. Ebullating pump 38 provides means for recycling and circulating the liquid hydrocarbon 28 through expanded hydroconversion catalyst bed 22.

The upper end of elongated vessel 12 includes catalyst inlet conduit means 40, which provides for the introduction of fresh hydroconversion catalyst while ebullated bed reactor system 10 is in operation. Fresh hydroconversion catalyst can be introduced into elongated vessel 12 through conduit means 40 by way of conduit 42. The lower end of elongated vessel 12 includes catalyst outlet conduit means 44, which provides for the removal of spent hydroconversion catalyst while ebullated bed reactor system 10 is in operation. The spent hydroconversion catalyst passes from elongated vessel 12 by way of conduit 46.

The inventive method includes operating ebullated bed reactor system 10, having been designed for use within its expanded hydroconversion catalyst bed 22 of first shaped hydroprocessing catalyst particles having a first geometry that includes having a first ratio of less than 5 $mm^{-1}$. Second shaped hydroprocessing catalyst particles having a second ratio of at least or greater than 5 $mm^{-1}$ are introduced into elongated vessel 12 and form either settled hydroconversion catalyst bed 14 or expanded hydroconversion catalyst bed 22, as the case may be. A heavy hydrocarbon feedstock passes through conduit 18 and is introduced into expanded hydroconversion catalyst bed 22, which is operated under hydroconversion reaction conditions. The heavy hydrocarbon conversion product having a low sediment content is yielded from elongated vessel 12 through conduit 32.

For the case in which the hydroconversion catalyst bed (either settled hydroconversion catalyst bed 14 or expanded hydroconversion catalyst bed 22, or both) comprises first shaped hydroprocessing catalyst particles having a first geometry that includes having a first ratio of less than 5 $mm^{-1}$, portions or incremental amounts of the first shaped hydroprocessing catalyst particles are continuously, or discontinuously, or periodically, removed from the hydroconversion catalyst bed within elongated vessel 12 by catalyst outlet conduit means 44 and through conduit 46. Incremental amounts of the second shaped hydroprocessing catalyst particles having a second geometry that includes having a second ratio of at least or greater than 5 $mm^{-1}$ are added to provide for a desired mix of the first shaped hydroprocessing catalyst particles and second shaped hydroprocessing catalysts within the hydroconversion catalyst bed required to provide for a heavy hydrocarbon conversion product having a reduced or low sediment yield. The heavy hydrocarbon conversion product is removed from elongated vessel by way of conduit 32.

The following examples are presented to illustrate the invention, but they should not be construed as limiting its scope.

EXAMPLE 1

This Example 1 describes the preparation of a cylindrically shaped, co-mulled comparison Catalyst A and a trilobe shaped, co-mulled Catalyst B. Also presented are various of the properties of these catalysts.

A co-mulled mixture was prepared by mulling for 35=Mites 100 parts pseudo-boehmite powder, 2.25 parts of nitric acid, 22.3 parts of catalyst fines, 10.5 parts of nickel nitrate flakes, 6.8 parts of ammonium di-molybdate crystals, and 122.6 parts of water. An aliquot portion of the co-mulled mixture was then extruded through cylindrical extrusion holes, and an aliquot portion of the co-mulled mixture was extruded through trilobe extrusion holes. The geometric characteristics of the particles of the two catalysts are presented in Table 1.

The extrudates were separately dried at 121° C. (250° IF) for 4 hours in an oven followed by calcination at 778° C. (1465° F.) for an hour in a static furnace to yield Catalyst A and Catalyst B.

Selected physical properties of the two catalysts are given in Table 1. Note that the catalysts were prepared by a single-step method, i.e., co-mulling, and have pore structures that include macropores.

TABLE 1

Properties of the Catalyst A and Catalyst B

|  | Catalyst A | Catalyst B |
| --- | --- | --- |
| Pellet diameter, mm | 0.98 | 0.91 |
| Pellet shape | Cylinder | Trilobe |
| Average pellet length, mm | 3 | 3 |
| Pellet cross section perimeter/area | 4.08 | 6.50 |
| Pellet surface/volume | 4.75 | 7.17 |
| Total PV, cc/g | 0.812 | 0.807 |
| MPD, A | 100 | 102 |
| Vol >350A, cc/g | 0.142 | 0.141 |
| Mo, wt % | 6.6 | 6.6 |
| Ni, wt % | 2.7 | 2.7 |
| P, wt % | 0.5 | 0.5 |

EXAMPLE 2

This Example 2 describes the conditions of the performance testing of Catalyst A and Catalyst B and presents the test results of the performance testing.

The catalysts were tested in a two-stage CSTR pilot plant. Feed properties are summarized in Table 2 and process conditions are presented in Table 3.

TABLE 2

Properties of the feed used to evaluate the catalysts

| 1050 F.+, wt % | 76.43 |
| --- | --- |
| SULFUR, wt % | 3.058 |
| MCR, wt % | 19.1 |
| NICKEL, wppm | 67 |
| VANDIUM, wppm | 264 |
| FEED DENSITY, g/ml | 1.0367 |
| n-C7 Insolubles, Wt % | 8.0 |
| n-C5 Insolubles, Wt % | 12.6 |

TABLE 3

Processes conditions used to evaluate the catalysts

| Catalyst LHSV, hr$^{-1}$ | 0.22 |
| --- | --- |
| Total pressure, psia | 2310 |
| H2/Oil ratio, scft/bbl | 2750 |
| Temperature, ° F. | 775 |

TABLE 4

Relative performance of Catalyst A and Catalyst B

|  | Catalyst | |
| --- | --- | --- |
|  | Catalyst A | Catalyst B |
| 1050 F. conversion | base | 100 |
| 950 F.+ conversion | base | 100 |
| Relative 660 F.+ Sediments | base | 43% of base |
| HDS activity | base | 98% of base |

While the results presented in Table 4 show that the trilobe-shaped catalyst, having a large ratio of cross section perimeter-to-cross sectional area of greater than 5 mm$^{-1}$ (i.e., 6.5 mm$^{-1}$), exhibits essentially the same desulfurization activity than that of the cylinder-shaped catalyst, having a small ratio of cross section perimeter-to-cross sectional area of less than 5 mm$^{-1}$ (i.e., 4.08 mm$^{-1}$), what is more significant, and unexpected, is that the trilobe-shaped catalyst provides material improvements in sediment yield. The sediment yield provided with the trilobe-shaped catalyst is 43% of the sediment yield provided with the cylindrical-shaped catalyst. The trilobe-shaped catalyst particle with its significantly higher ratio of cross section perimeter-to-cross sectional area than that of the cylindrical particle (i.e., 6.5 mm$^{-1}$ versus 4.08 mm$^{-1}$) contributes to the observed reduction in sediment yield.

EXAMPLE 3

This Example 3 describes the preparation of a large particle, impregnated comparison Catalyst C, having a geometry such that the value for its characteristic cross section perimeter-to-cross sectional area is small and that of a small particle, impregnated Catalyst ID having use in one embodiment of the invention and a geometry such that the value for its characteristic cross section perimeter-to-cross sectional area is relatively large.

An extrudable alumina paste or mixture was prepared by combining 200 parts of alumina powder, 1 part of nitric acid, and 233 parts of water. A portion of the mixture was then extruded through cylindrical extrusion holes and a portion of the mixture was extruded through trilobe extrusion holes. The extrudates were dried at 121° C. (250° F.) for 4 hours in an oven and then calcined at 677° C. (1250° F.) for an hour in a static furnace. The resulting, alumina supports (comprising, consisting essentially of, or consisting of alumina) were then impregnated with a portion of an aqueous solution containing, molybdenum, nickel and phosphorus, in amounts so as to provide catalysts with the metal loadings indicated in Table 1, dried at 121° C. (250° F.) for 4 hours, and calcined at 482° C. (900° F.) for an hour.

Selected properties for the resulting Catalyst C and Catalyst D are summarized in Table 5. It is noted that these catalysts contain insignificant macroporosity.

TABLE 5

|  | Catalyst C | Catalyst D |
| --- | --- | --- |
| Pellet diameter, mm | 0.93 | 0.97 |
| Pellet shape | Cylinder | Trilobe |
| Average pellet length, mm | 3 | 3 |
| Pellet cross section perimeter/area | 4.35 | 7.73 |
| Pellet surface/volume | 5.01 | 8.40 |
| Total PV, cc/g | 0.73 | 0.73 |
| MPD, A | 105 | 105 |
| Vol >350A, cc/g | 0.02 | 0.02 |

TABLE 5-continued

|  | Catalyst C | Catalyst D |
|---|---|---|
| Mo, wt % | 6.5 | 6.5 |
| Ni, wt % | 1.8 | 1.8 |
| P, wt % | 0.7 | 0.7 |

EXAMPLE 4

This Example 4 describes the conditions of the performance testing of Catalyst C and Catalyst D and the results of the performance testing.

The catalysts were tested in a two-stage CSTR pilot plant. The properties of the feed are summarized in Table 6, and the process conditions are presented in Table 7.

TABLE 6

| Properties of the feed used to evaluate the catalysts | |
|---|---|
| 1000 F.+, wt % | 87.7 |
| SULFUR, wt % | 5.255 |
| MCR, wt % | 20.8 |
| NICKEL, wppm | 43 |
| VANDIUM, wppm | 130 |
| FEED DENSITY, g/ml | 1.0347 |
| n-C7 Insolubles, Wt % | 12.7 |
| n-C5 Insolubles, Wt % | 20.9 |

TABLE 7

| Processes conditions used to evaluate the catalysts | |
|---|---|
| Catalyst LHSV, hr$^{-1}$ | 0.55 |
| Total pressure, psia | 2250 |
| H2/Oil ratio, scft/bbl | 4090 |
| Temperature, ° F. | 795 |

The performance of Catalyst D relative to the performance of Catalyst C (Base) is summarized in Table 8.

TABLE 8

| Relative performance of the catalysts | | |
|---|---|---|
|  | Catalyst | |
|  | Catalyst C | Catalyst D |
| 1000 F. conversion, wt % | Base | 100 |
| Relative 650 F.+ Sediments, % of base | Base | 64 |
| Relative 650 F.+ Sulfur, % of base | Base | 101 |
| Relative 650 F.+ density, % of base | Base | 100 |

A review of the performance results presented in Table 8 shows that the conversion and desulfurization catalytic performance of Catalyst D are essentially the same as those of Catalyst C. Catalyst D, however, unexpectedly provides for a huge improvement in sediment yield as compared to Catalyst C. Catalyst D unexpectedly provides for 64% of the sediment yield that is provided by Catalyst C; thus, giving a 36% reduction in sediment yield over that provided by Catalyst C. These results show that the impregnated and low macroporosity ebullated bed catalyst particles, having a small particle size and specific geometry (i.e., cross section perimeter-to-cross sectional area ratio), unexpectedly affects sediment yield while having little or no impact on other of the catalytic properties, such as, conversion and desulfurization.

That which is claimed is:

1. A method of operating an ebullated bed process for the hydroconversion of a heavy hydrocarbon feedstock, wherein said method comprises:

providing an ebullated bed reactor system, comprising an ebullated bed reactor vessel that defines a reactor volume within which is an ebullated bed reaction zone defined by a catalyst bed comprising first shaped hydroprocessing catalyst particles having a first geometry providing for a first ratio of the cross section perimeter-to-cross sectional area that is less than 5 mm$^{-1}$, and wherein said reactor volume further includes an upper zone above said ebullated bed reaction zone and a lower zone below said ebullated bed reaction zone;

introducing said heavy hydrocarbon feedstock into said ebullated bed reaction zone, which is operated under hydroconversion reaction conditions;

removing a portion of said first shaped hydroprocessing catalyst particles from said catalyst bed at a removal rate in the range upwardly to 5% of the total weight of catalyst inventory within said reactor volume per day of operation;

replacing said first shaped hydroprocessing catalyst particles removed from said catalyst bed by adding to said catalyst bed an incremental amount of a second shaped hydroprocessing catalyst particles at an addition rate in the range upwardly to 5% of the total weight of catalyst inventory within said reactor volume per day of operation, wherein said second shaped hydroprocessing catalyst particles have a second geometry that is polylobal and provides for a second ratio of the cross section perimeter-to-cross sectional area that is at least 5 mm$^{-1}$ and less than 8 mm$^{-1}$ and a cross sectional area-to-particle volume in the range of from 5 mm$^{-1}$ to 15 mm$^{-1}$; and yielding from said reactor volume a heavy hydrocarbon conversion product having a reduced sediment content.

2. The method of claim 1, wherein said first shaped hydroprocessing catalyst particles comprise an inorganic oxide powder in an amount in the range of from about 75 wt. % to 96 wt. %, a molybdenum compound in an amount in the range of from 3 wt. % to 15 wt. %, and a nickel compound in an amount in the range of from 0.5 wt. % to 6 wt. %, wherein each wt. % is based on the total weight of said first shaped hydroprocessing catalyst particle and the metal as an oxide regardless of its actual form, wherein said second shaped hydroprocessing catalyst particles comprise an inorganic oxide powder in an amount in the range of from about 75 wt. % to 96 wt. %, a molybdenum compound in an amount in the range of from 3 wt. % to 15 wt. %, and a nickel compound in an amount in the range of from 0.5 wt. % to 6 wt. %, wherein each wt. % is based on the total weight of said second shaped hydroprocessing catalyst particle and the metal as an oxide regardless of its actual form.

3. The method of claim 2, wherein said second ratio is at least 5.5 mm$^{-1}$ and less than 8 mm$^{-1}$.

4. The method of claim 2, wherein said second ratio is at least 6 mm$^{-1}$ and less than 8 mm$^{-1}$.

5. The method of claim 4, wherein said hydroconversion reaction conditions include a contacting temperature in the range of from 316° C. (600° F.) to 538° C. (1000° F.), a contacting pressure in the range of from 500 psia to 6,000 psia, a hydrogen-to-oil ratio in the range of from 500 scf/bbl to 10,000 scf/bbl, and liquid hourly space velocity (LHSV) in the range of from 0.1 hr$^{-1}$ to 5 hr$^{-1}$.

6. A method of operating an ebullated bed process for the hydroconversion of a heavy hydrocarbon feedstock, wherein said method comprises:

provoding an ebullated bed reactor system designed for the use of first shaped hydroprocessing catalyst particles having a first geometry providing for a first ratio of the cross section perimeter-to-cross sectional area that is less than 5 $mm^{-1}$ in a catalyst bed defining an ebullated bed reaction zone contained within a reactor volume defined by an ebullated bed reactor vessel, wherein said reactor volume includes an upper zone above said ebullated bed reaction zone and a lower zone below said ebullated bed reaction zone;

introducing said heavy hydrocarbon feedstock into said ebullated bed reaction zone, which is operated under hydroconversion reaction conditions;

adding said first shaped hydroprocessing catalyst particles to said catalyst bed at a first incremental addition rate;

introducing into said catalyst bed of said reactor volume at a second incremental addition rate second shaped hydroprocessing catalyst particles having a second geometry that is polylobal and provides for a second ratio of the cross section perimeter-to-cross sectional area that is at least 5 $mm^{-1}$ and less than 8 $mm^{-1}$ and a cross sectional area-to-particle volume in the range of from 5 $mm^{-1}$ to 15 $mm^{-1}$ to thereby form said ebullated bed reaction zone;

operating said ebullated bed reactor system with a desired ratio of said first shaped hydroprocessing catalyst particles and said second shaped hydroprocessing catalyst particles within said ebullated bed reaction zone by:

adjusting said first incremental addition rate and said second incremental addition rate to maintain the desired ratio while removing a portion of said catalyst bed at a rate to maintain the desired ratio; and yielding from said reactor volume a heavy hydrocarbon conversion product having a low sediment content.

7. The method of claim 6, wherein said first shaped hydroprocessing catalyst particles comprise an inorganic oxide powder in an amount in the range of from about 75 wt. % to 96 wt. %, a molybdenum compound in an amount in the range of from 3 wt. % to 15 wt. %, and a nickel compound in an amount in the range of from 0.5 wt. % to 6 wt. %, wherein each wt. % is based on the total weight of said first shaped hydroprocessing catalyst particle and the metal as an oxide regardless of its actual form, wherein said second shaped hydroprocessing catalyst particles comprise an inorganic oxide powder in an amount in the range of from about 75 wt. % to 96 wt. %, a molybdenum compound in an amount in the range of from 3 wt. % to 15 wt. %, and a nickel compound in an amount in the range of from 0.5 wt. % to 6 wt. %, wherein each wt. % is based on the total weight of said second shaped hydroprocessing catalyst particle and the metal as an oxide regardless of its actual form.

8. The method of claim 7, wherein said second ratio is at least 5.5 $mm^{-1}$ and less than 8 $mm^{-1}$.

9. The method of claim 7, wherein said second ratio is at least 6 $mm^{-1}$ and less than 8 $mm^{-1}$.

10. The method of claim 9, wherein said hydroconversion reaction conditions include a contacting temperature in the range of from 316° C. (600° F.) to 538° C. (1000° F.), a contacting pressure in the range of from 500 psia to 6,000 psia, a hydrogen-to-oil ratio in the range of from 500 scf/bbl to 10,000 scf/bbl, and liquid hourly space velocity (LHSV) in the range of from 0.1 $hr^{-1}$ to 5 $hr^{-1}$.

* * * * *